Dec. 10, 1968   M. E. NEREM   3,415,028
PANEL JOINT STRUCTURE
Filed Nov. 30, 1966   3 Sheets-Sheet 1
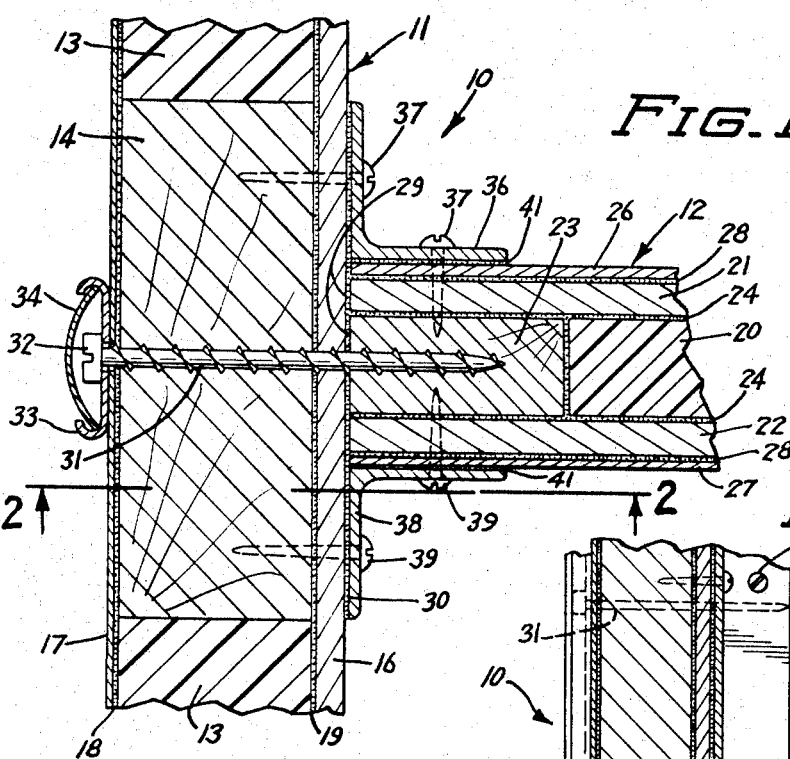
FIG. 1
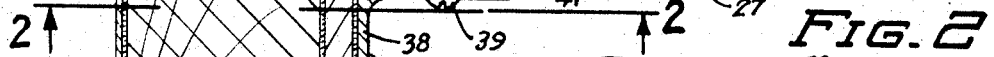
FIG. 2
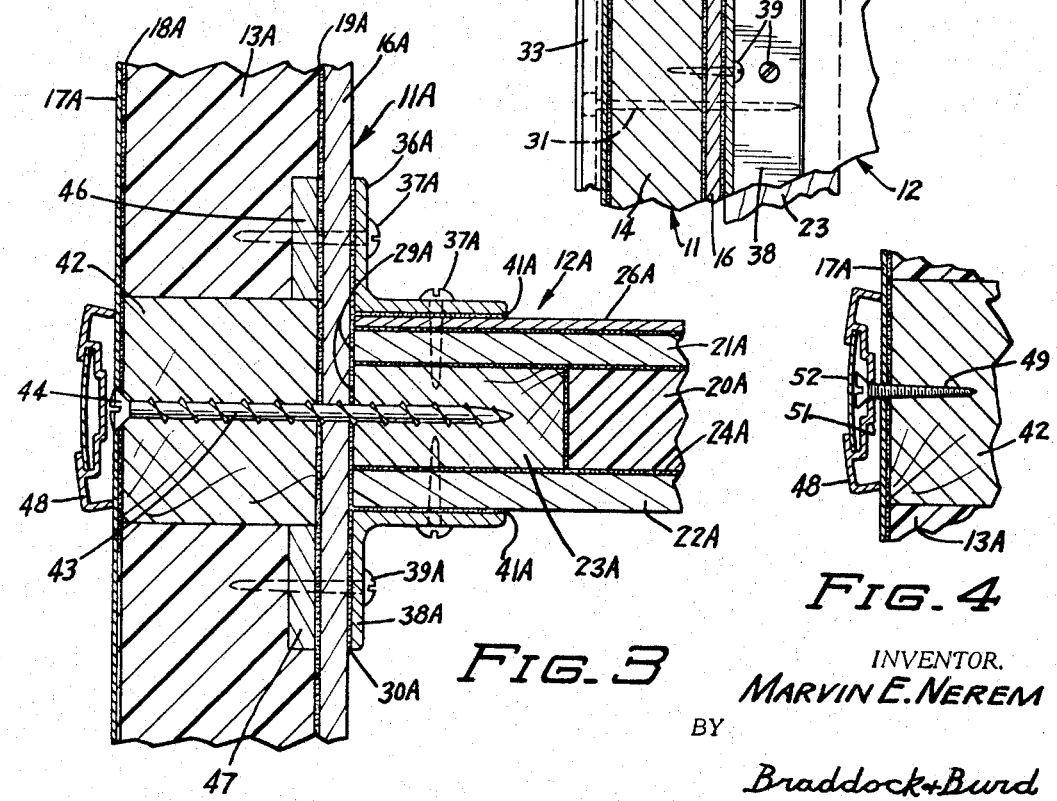
FIG. 3
FIG. 4
INVENTOR.
MARVIN E. NEREM
BY
Braddock+Burd
ATTORNEYS

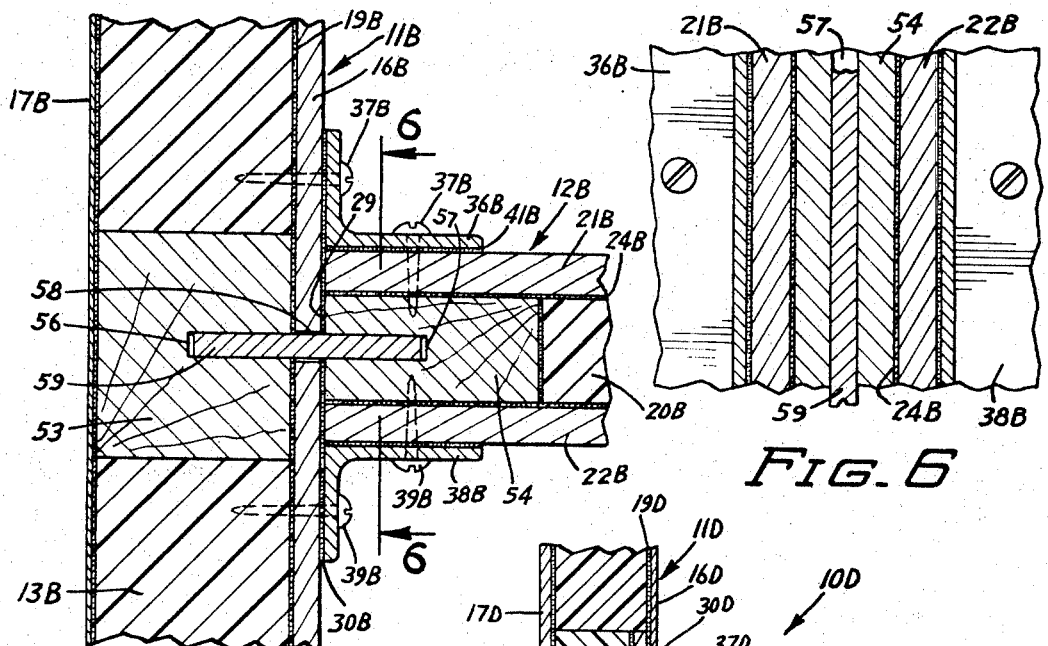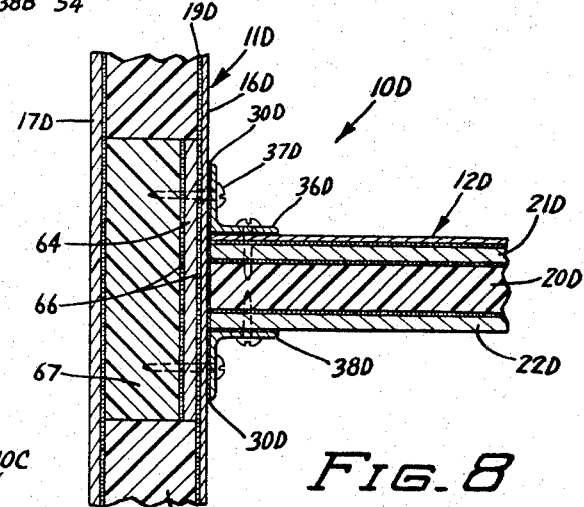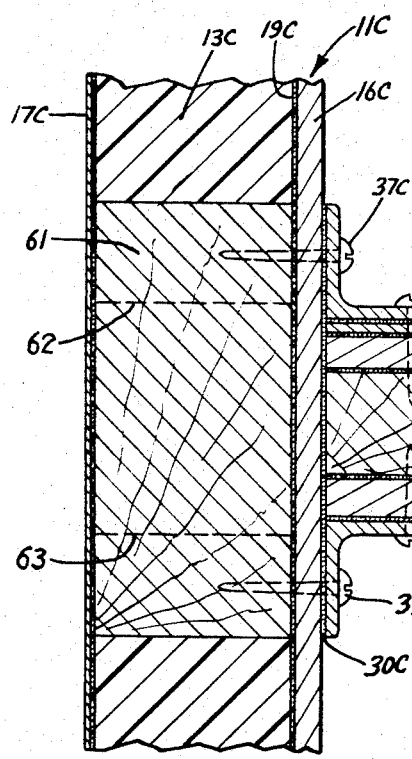

Dec. 10, 1968    M. E. NEREM    3,415,028
PANEL JOINT STRUCTURE
Filed Nov. 30, 1966    3 Sheets-Sheet 3
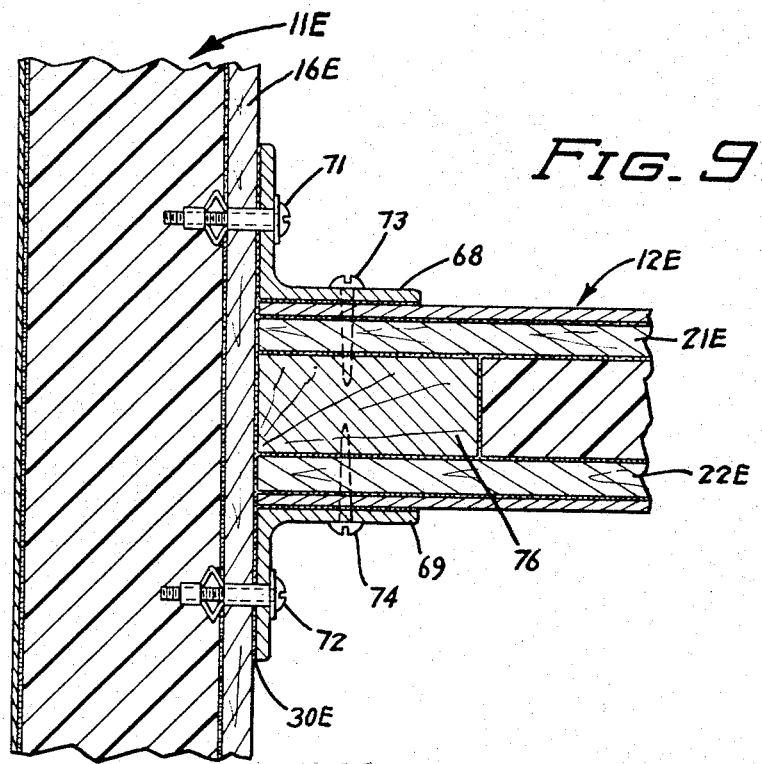
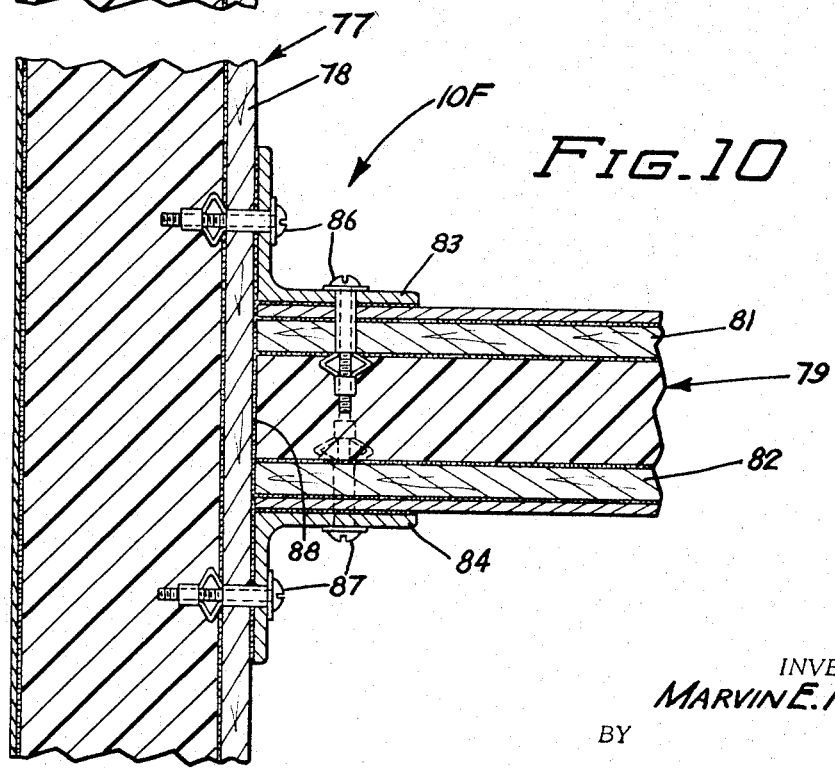
INVENTOR.
MARVIN E. NEREM
BY
Braddock+Burd
ATTORNEYS United States Patent Office 3,415,028
Patented Dec. 10, 1968

3,415,028
PANEL JOINT STRUCTURE
Marvin E. Nerem, Forest City, Iowa, assignor to Winnebago Industries, Inc., Forest City, Iowa, a corporation of Iowa
Continuation-in-part of application Ser. No. 560,159, June 24, 1966. This application Nov. 30, 1966, Ser. No. 597,983
33 Claims. (Cl. 52—281)

ABSTRACT OF THE DISCLOSURE

A T-joint structure connecting normally disposed sandwich panels. A first sandwich panel has a support member interposed between an inner plywood facing and an outer sheet metal facing adjacent core material. Bonding means secures the facings to opposite sides of the core material and the support member. A second sandwich panel has an anchor member located between sheet-like members and extended along one side of the panel. Bonding material secures the anchor member to the sheet-like members. Right angle holding members are located on opposite sides of the second panel. First screws attach the holding members to the inner facing of the first panel and second screws extended into the anchor member attach the holding members to the second panel. Third fastening screws extend through the facings and support of the first panel and into the anchor member of the second panel to hold the panels in assembled relation. Adhesive material is interposed between the engaging surfaces of the first and second panels.

---

This application is a continuation-in-part of United States patent application Ser. No. 560,159 filed June 24, 1966, now abandoned.

This invention relates to a structural joint for connecting two members and more particularly to a joint structure for securing laminated construction panels together.

Briefly stated, the invention comprises joint structure for fastening angularly disposed sandwich panels to each other. The joint structure includes holding means securing the panels together. The holding means include first fastening means attaching the holding means to the panels. The joint may have a second fastening means which cooperates with a support member in one of the sandwich panels and an anchoring member in the second sandwich panels to hold the panels in assembled relation with respect to each other. The engaging surfaces of the sandwich panels may be coated with bonding material to adhesively secure the sandwich panels together.

In the drawings:
FIGURE 1 is a sectional view of sandwich panels secured together with the joint structure of this invention;
FIGURE 2 is a sectional view taken along the line 2—2 of FIGURE 1;
FIGURE 3 is a sectional view of sandwich panels secured together with a modification of the joint structure of this invention;
FIGURE 4 is a sectional view showing the molding used to cover the heads of the fastening means of the joint structure of FIGURE 3;
FIGURE 5 is a sectional view of sandwich panels secured together with a further modification of the joint structure of the invention;
FIGURE 6 is a sectional view taken along the line 6—6 of FIGURE 5;
FIGURE 7 is a sectional view of sandwich panels secured together with another modification of the joint structure of this invention;
FIGURE 8 is a sectional view of sandwich panels secured together with still another modification of the joint structure of the invention;
FIGURE 9 is a sectional view of sandwich panels secured together with still another modification of the joint structure of this invention; and
FIGURE 10 is a sectional view of sandwich panels secured together with a further modification of the joint structure of the invention.

Referring to the drawings, there is shown in FIGURE 1 and 2 one example of the joint structure of this invention indicated generally at 10 connecting a first sandwich panel 11 with a second sandwich panel 12. Panel 11 may be viewed as an upright wall and panel 12 may be viewed as a floor secured to the inside of the upright wall. For example, panels 11 and 12 may be used in light building construction as mobile homes, campers, house trailers, motor homes interior partitions and like structures.

Sandwich panel 11 has core material 13 located on opposite sides of an elongated support member 14, shown as a wood rail. Core material 13 is an expanded plastic, as polystyrene, polyurethane and similar foamed plastic materials. Other materials, as paper, metal, honeycomb, plywood, fibrous boards and the like may be used as core material. Member 14 can be any rigid material which has sufficient strength to anchor fastening means used to connect the panels together. Core material 13 and support member 14 are sandwiched between an inner facing 16 and an outer facing 17. Thin layers of adhesive 18 and 19 bond the inner and outer facings 16 and 17 to the opposite sides of the core material 13 and support member 14. Inner facing 16 is flat sheet-like material, as plywood, bonded to the core material and elongated support member. Outer facing 17 is a flat metal sheet, as aluminum, bonded to the outer face of the core material in the elongated support member. The inner and outer facings 16 and 17 secured to opposite sides of core material 13 and elongated support member 14 comprise a one-piece, rigid insulated sandwich panel indicated generally at 11.

The second sandwich panel 12 comprises flat core material 20, which may be similar to the core material 13, located between back up members 21 and 22, shown as spaced plywood panels. Members 21 and 22 may be any sheet-like panels which have sufficient strength to reinforce and protect core material 20. The peripheral sections of members 21 and 22 extend outwardly or laterally beyond the edges of core material 20 adjacent opposite sides of an elongated reinforcing and anchoring member 23. A layer of bonding material 24 secures core material 20 and edge reinforcing anchor member 23 to the back up members 21 and 22. The bonding material between the adjacent faces of the reinforcing member 23 and core 20 may be eliminated.

The outer surfaces of back up members 21 and 22 are covered with facing members 26 and 27 respectively. Bonding material 28 is used to secure facing members 26 and 27 to the back up members forming a multi-layer laminated panel. Facings 26 and 27 may be of any suitable material, as metal, plywood, carpet, linoleum, or the like.

The outer edges 29 of back up members 21 and 22 and reinforcing anchoring member 23 present a substantially flat surface. As shown in FIGURE 2, members 21, 22 and 23 are in surface engagement with the outside surface of inner facing 16 with anchoring member 23 located adjacent and parallel to support member 14. A material 30 may be interposed between the outer edge 29 of back up members 21 and 22 and reinforcing anchoring member 23 and the inner facing 16. Material 30 may be a combination sealant and adhesive such as a material having a base of natural reclaimed rubber combined with resin reinforced elastomer or an adhesive material or a sealant.

Fastening means 21, as screws, wood screws, driven fastening members, elongated driven members having heads, nails, nut and bolt assemblies and the like, project transversely through the first sandwich panel and into anchoring member 23 to secure the first panel to the second panel. As shown in FIGURE 2, the fastening means 31 are spaced at selected intervals and extend through support member 14 into elongated anchoring member 23 to hold the adjacent edge of the second panel 12 in tight engagement with the inside facing 16.

To enhance the decorative effect of the joint, head 32 of the fastening means may hold an elongated strip or trim molding 33 against outside facing 17. Strip 33 has inwardly projecting flanges to accommodate a removable elongated cover 34. The opposite edges of cover 34 located within the inwardly turned flanges of strip 33 hold the cover in assembled relation with the strip with the cover, enclosing head 32 of the fastening means.

Located in the corner and secured to adjacent facings of the first and second panels 11 and 12 are top and bottom holding members 36 and 38 respectively. Members 36 and 38 may be used in addition to or instead of fastening member 31. Fastening means 37 and 39, as screws, secure the holding members to the elongated support 14 of the first sandwich panel and the anchoring member 23 of the second sandwich panel. Interposed between the holding members and the adjacent faces of the panels may be a thin layer of material 41 similar to the material 30. Holding members 36 and 38 are shown as continuous right angle strips covering the corner of the joint. Members 36 and 38 may be intermittent clips. Whether continuous or intermittent, they may be installed on either one or both sides of second sandwich panel 12 and may have other cross-sectional shapes, as arcuate, concave or convex, as well as rectangular U-shape and T-shape. These members may be formed, rolled or extruded metal strips, wood, plastic or the like.

In use, to construct joint structure 10, sandwich panels having elongated support members, as elongated support member 14 and elongated edge anchoring member 23 are initially constructed. Before the first and second panels are secured together, lead holes may be drilled through elongated support member 14 at spaced intervals to accommodate the shank of the fastening means 31. Similar guide holes may be drilled transversely into anchoring member 23 from the outside surface. The material 30 may then be placed on the outside surfaces of sandwich panel 12 which engages inner facing 16 of first panel 11. Fastening means 31 are then driven transversely through elongated support member 14 and into anchoring member 23 to draw the sandwich panels into engagement with each other with the edge 29 of panel 12 in close proximity to or in contact with facing 16. Holding members 36 and 38 may then be placed in the corners of the joint and secured in place with fastening means 37 and 39 and material 41 may be interposed between the holding members and the adjacent faces of the panel.

The T-joint structure shown in FIGURE 1 has edge surfaces 29 of anchoring member 23 and the back up members 21 and 22 in a substantially common plane normal to the horizontal plane of panel 12. The plane of these edge surfaces may be at an angle greater or less than 90 degrees with respect to the panel surfaces whereby panel 12 extends from panel 11 at an angle other than 90 degrees.

When trim molding 33 is used, it may be placed over fastening member 31 before the fastening member is driven through the elongated support member 14 or it may be placed against member 17 before fastening member 31 is turned through the elongated support member 14. Head 32 of the fastening member may hold the trim molding in engagement with the outer facing 17. Cover 34 is inserted under the flanges of molding 33 to conceal heads 32.

Facing 16 has been shown as a piece of plywood. It could be sheet metal, as aluminum, or a sheet of hard board. All materials that are used as facings on either the first or second sandwish panels may be of many varieties and are preferably materials that are produced in sheet form such as, without being limited to, steel, aluminum, plywood, hard board and fiberglass-reinforced plastic and the like.

Referring to FIGURES 3 and 4, there is shown a modification of the joint structure shown in FIGURE 1. The structure of FIGURE 3 which corresponds to the structure of FIGURE 1 is identified with the identical reference numbers having the suffix A. In FIGURE 3, sandwich panel 11A has an elongated support member 42 interposed between the facings 16A and 17A. A plurality of fastening means 43, as a screw, having a head 44 are driven through support member 42 into anchoring member 23A of the second panel 12A. Head 44 of the fastening member is not used to hold molding 38.

As shown in FIGURE 3, positioned adjacent opposite sides of elongated member 42 and adjacent inner facing 16A are elongated reinforcing members 46 and 47, as strips of plywood, for receiving the fastening means 37A and 39A used to attach holding members 36A and 38A to first panel 11A.

Molding 48 is positioned on the outer facing 17A and retained there by a plurality of spaced driven members 49, as screws, nails, staples or the like. Molding 48 has an inwardly projected recessed center 51 for accommodating the heads of the driven members. A cover 52 retained in place by facing flanges on molding 48 covers the heads of the driven members 49. The heads of such fastening members as 31 and 43 may be concealed by other similar molding devices.

Referring to FIGURES 5 and 6, there is shown another modification of the joint structure of FIGURE 1 with identical parts identified with the same reference numbers having the suffix B. Joint structure 10B has an elongated support member 53 sandwiched between the outer facing 17B and the inner facing 16B of the first sandwich panel 11B and reinforcing anchor member 54 sandwiched between the back up members 21B and 22B of the second sandwich panel 12B. Support member 53 has a longitudinal slot 56 open to an opening 58 in facing 16B. A similar elongated slot 57 in anchoring member 54 opens to the outer edge of the anchoring member. A flat elongated spline means 59 projects through opening 58 in inner facing 16B and into slots 56 and 57. The elongated flat spline or rib 59 coactively joins support member 53 with anchoring member 54. Spline 59 may be replaced with a plurality of spaced dowels projected into support 53 and anchor 54. The material 30B interposed between the outer edge 29 and the inner facing 16B along with the holding members 36B and 38B with their associated fastening means 37B and 39B, if members 36B and 38B are used, holds the joint in a fixed assembled relation.

A further modification of the joint structure is shown in FIGURE 7. The parts of FIGURE 7 which correspond to the joint structure of FIGURE 1 have identical reference numbers indicated by the suffix C. Joint structure 10C has a support member 61 sandwiched between the outer facing 17C and inner facing 16C. Support member 61 may be divided into a pair of elongated members, indicated with broken lines 62 and 63, aligned with holding members 36C and 38C. Core material can be positioned between the pair of support members. Second panel 12C is secured to the inner facing 16C by holding members 36C and 38C and their associated fastening means 37C and 39C. The fastening means project through inner facing 16C and into elongated support member 61. A material 30C, corresponding to material 30, may be incorporated in the area between panel 12C and the inner facing 16C.

FIGURE 8 shows a further modification of the joint structure indicated generally at 10D with corresponding parts of FIGURE 1 indicated with the same reference numbers having the suffix D. Joint structure 10D has a first panel 11D having an upright flat reinforcing support member 64 positioned adjacent the inside of inner facing 16D. Bonding material 66 secures the support member with the inside surface of facing 16D and to a piece of core material 67 interposed in the space between support member 64 and outer facing 17D. Fastening means 37D and 39D for holding members 36D and 38D extend through inner facing 16D and reinforcing member 64. Material 30D corresponding to material 30 may be used between the second sandwich panel 12D and the inner facing 16D of the first panel 11D.

FIGURE 9 shows another modification of the joint structure indicated generally at 10E with corresponding parts of FIGURE 1 indicated with the same reference numbers having the suffix E. First panel 11E is attached to second panel 12E with holding members 68 and 69. Blind fasteners 71 and 72 secure the holding members 68 and 69 to facing 16E of panel 11E and fasteners 73 and 74 secure the holding members to panel 12E. Fasteners 73 and 74 are driven members, as screws, which extend through the facings 21E and 22E of panel 12E into anchoring member 76. Material 30E corresponding to material 30 may be used between the engaging surfaces of the panels and between the holding members and the panels.

FIGURE 10 shows still a further modification of the joint structure indicated generally at 10F. Joint structure 10F has a first sandwich panel 77 having an inner facing 78 and a second sandwich panel 79 having facings 81 and 82. Holding members 83 and 84 are used to secure the panels together. Blind fasteners 86 attach holding member 83 to facings 78 and 81. In the same manner blind fasteners 87 attach holding member 84 to facings 78 and 82. Material 88 corresponding to material 30 may be used between engaging surfaces of the panels and between the holding members and the panels.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A joint structure in sandwich panel construction comprising in combination: a first sandwich panel having an inner facing an outer facing and core material interposed between and bonded to the inner facing and outer facing, a second sandwich panel positioned adjacent the first sandwich panel, said second sandwich panel having an inner facing, an outer facing, an anchor means located along one edge of and between the inner facing and outer facing and bonding material securing the anchor means to the inner facing and outer facing, holding means securing the second sandwich panel to the first sandwich panel, said holding means having a first portion positioned adjacent one facing of the first sandwich panel and a second portion positioned adjacent one facing of the second sandwich panel, first fastening means connecting said first portion with said one facing of the first panel and second fastening means connecting said second portion with said one facing of the second panel and extended into the anchor means thereby holding the second panel in engagement with said one facing of the first panel.

2. The joint structure of claim 1 including adhesive material between engaging surfaces of the first panel and the second panel.

3. A joint structure in sandwich panel construction comprising in combination: a first sandwich panel having at least one support member interposed between an inner facing and an outer facing, a second sandwich panel positioned adjacent the first sandwich panel, holding means securing the second sandwich panel to the first sandwich panel, said holding means having a portion positioned adjacent one facing of the first sandwich panel and fastening means projected through said portion and into said first panel holding the second panel in engagement with said one facing of the first panel, said second panel including an anchoring means having an elongated slot, said one facing and support member of the first panel having matching elongated slots, bonding material between abutting surfaces of the adjacent panels and spline means interposed in said slots coactively joining the support member with the anchoring means.

4. The joint structure of claim 1 wherein said holding means comprises members located on opposite sides of the second panel, each member having a first portion positioned adjacent one facing of the first panel and a second portion positioned adjacent one facing of the second panel, and first and second fastening means securing the first and second portions to adjacent panels, said second fastening means extending into the anchor means.

5. The joint structure of claim 4 including adhesive material between engaging surfaces of the holding means and second panel and between the holding means and the adjacent facing of the first panel.

6. The joint structure of claim 1 including a support member comprising a flat member bonded to the inside surface of the inner facing of the first panel, said first fastening means projected into the flat member.

7. The joint structure of claim 1 including a support member comprising a pair of spaced elongated rail members and said first fastening means projected through said one facing of the first panel into the elongated rail members.

8. The joint structure defined in claim 1 including a support member located between and bonded to the inner facing of the first panel, and third fastening means projected through the support member and into the anchoring means.

9. The joint structure defined in claim 8 including adhesive material between engaging surfaces of the first panel and the second panel.

10. The joint structure of claim 8 including means engaging the outer facing of the first panel for covering the third fastening means.

11. Joint structure in sandwich panel construction comprising in combination: a first sandwich panel having a first facing, a second facing spaced from the first facing, at least one support member interposed between said facings, core material located between said facings, bonding means securing opposite sides of the core material and the support member to said facings, a second sandwich panel having spaced sheet-like members, anchor means interposed between said spaced sheet-like members along one side of said members, and core material located between said spaced sheet-like members, bonding means securing the anchor means and core material to said sheet-like members, fastening means extended through said first facing, the support member, the second facing, and into the anchor means for holding the second panel in engagement with the first panel, adhesive material interposed between engaging surfaces of the first and second panel, and holding means cooperating wtih fastening means to secure the first panel to the second panel, said holding means having a first portion positioned adjacent one facing of the first panel and a second portion positioned adjacent one sheet-like member of the second panel, and attaching means connecting the first portion to the one facing and the second portion to the one sheet-like member.

12. The joint structure of claim 11 wherein said attaching means includes fastening members extended through the second portion and into the anchor means.

13. The joint structure of claim 11 wherein said holding means comprises members located on opposite sides of the second panel, each member having a first portion positioned adjacent one facing of the first panel and a second portion positioned adjacent one sheet-like member of the second panel and first and second attaching means securing the first and second portions to said one facing and one sheet-like member respectively, said second fastening means extending into the anchor means.

14. Joint structure in sandwich panel construction comprising in combination: a first sandwich panel having at least one support member interposed between an inner facing and an outer facing, said inner facing being of plywood and said outer facing being sheet aluminum, said inner and outer facings being bonded to opposite sides of core material of foam polystyrene, a second sandwich panel positioned adjacent the first sandwich panel, said second sandwich panel having spaced plywood sheet-like members and anchoring means interposed between said sheet-like members, and core material of foamed polystyrene bonded to and positioned between said plywood sheet-like members, means securing the anchoring means to at least one side of the sheet-like members, fastening means extended through the outer facing, the support member, the inner facing and into the anchoring means, said fastening means coacting with the anchor means to hold the second panel in engagement with one facing of the first panel, an adhesive material interposed between engaging surfaces of the first and the second panel, said adhesive material being a sealant and adhesive having a base of natural reclaimed rubber combined with a resin reinforced elastomer and holding means cooperating with the fastening means to secure the first panel to the second panel, said holding means having a first portion positioned adjacent one facing of the first panel and a second portion positioned adjacent one of the sheet-like members, and attaching means connecting the first portion to the one facing and the second portion to one of the sheet-like members.

15. The joint structure of claim 14 wherein said holding means comprises members located on opposite sides of the second panel, each member having a first portion adjacent one facing of the first panel and a second portion positioned adjacent one of the sheet-like members of the second panel, and first and second attaching means securing the first and second portions to the one facing and the one sheet-like member respectively, said second attaching means extending into the anchor means.

16. Joint structure in sandwich panel construction comprising in combination: a first sandwich panel having at least one support member interposed between an inner facing and an outer facing, expanded foam plastic core material located between the inner facing and outer facing, adhesive means for bonding the inner facing, and the outer facing, to respective opposite sides of the core material and support member, a second sandwich panel positioned adjacent the first sandwich panel, said second sandwich panel having spaced sheet-like members and anchoring means interposed between said spaced sheet-like members, means securing the anchor means to at least one side of the sheet-like members, and fastening means extended through the outer facing, the support member, the inner facing and into the anchoring means, said fastening means coacting with the anchoring means for holding the second panel in engagement with one facing of the first panel.

17. The joint structure defined in claim 16 wherein said second panel includes expanded foam plastic core material bonded to and positioned between the spaced sheet-like members.

18. The joint structure defined in claim 16 wherein said second panel includes core material bonded to and positioned between the sheet-like members, said anchoring means comprising an elongated reinforcing member located along at least one side of the core material and bonded to the sheet-like members.

19. The joint structure defined in claim 18 wherein said reinforcing member and sheet-like members have outer edge surfaces located in a substantially common plane.

20. The joint structure defined in claim 16 further characterized with adhesive material interposed between engaging surfaces of the first panel and the second panel.

21. The joint structure defined in claim 20 wherein said adhesive material is a combination sealant and adhesive.

22. The joint structure defined in claim 16 further characterized with a sealing material interposed between engaging surfaces of the first panel and the second panel.

23. Joint structure in sandwich panel construction comprising in combination: a first sandwich panel having at least one support member interposed between an inner facing and an outer facing, said inner facing being of plywood and said outer facing being sheet aluminum, said inner and outer facings being bonded to opposite sides of core material of foam polystyrene, a second sandwich panel positioned adjacent the first sandwich panel, said second sandwich panel having spaced plywood sheet-like members and anchoring means interposed between said sheet-like members, and core material of foamed polystyrene bonded to and positioned between said plywood sheet-like members, means securing the anchoring means to at least one side of the sheet-like members, fastening means extended through the outer facing, the support member, the inner facing and into the anchoring means, said fastening means coacting with the anchor means to hold the second panel in engagement with one facing of the first panel, and an adhesive material interposed between engaging surfaces of the first and the second panel, said adhesive material being a sealant and adhesive having a base of natural reclaimed rubber combined with a resin reinforced elastomer.

24. The joint structure defined in claim 23 wherein said fastening means comprises a plurality of spaced wood screws.

25. The joint structure defined in claim 23 wherein said support member and said anchoring means are both elongated wood members.

26. The joint structure defined in claim 23 further characterized with a first facing member of flooring material covering one plywood sheet-like member and a second facing member of sheet aluminum bonded to and covering the other plywood sheet-like member.

27. The joint structure defined in claim 23 wherein said fastening means comprises a plurality of driven fastening members.

28. The joint structure defined in claim 23 including means engaging the outer facing of the first sandwich panel for covering the fastening means extended through the outer facing.

29. The joint structure defined in claim 28 wherein the fastening means comprises elongated driven members having heads, said covering means comprising a trim member secured to the outer facing with the fastening means, said trim member having a covered space for accommodating the heads of the elongated driven members.

30. Joint structure in sandwich panel construction comprising in combination: a first sandwich panel having a first facing, a second facing spaced from the first facing, at least one support member interposed between said facings, core material located between said facings, bonding means securing opposite sides of the core material and the support member to said facings, a second sandwich panel having spaced sheet-like members, anchor means interposed between said spaced sheet-like members along one side of said members, and core material located between said spaced sheet-like members, bonding means securing the anchor means and core material to said sheet-like members, fastening means extended through said first facing, the support member, the second facing, and into the anchor means for holding the second panel in engagement with the first panel, and adhesive material interposed between engaging surfaces of the first and second panel.

31. The joint structure defined in claim 30 wherein said support member and said anchor means are both elongated members.

32. The joint structure defined in claim 30 wherein said fastening means comprise a plurality of spaced fastening members.

33. The joint structure defined in claim 30 wherein said anchor means and the sheet-like members have outer edges located in a substantially common plane.

References Cited
UNITED STATES PATENTS

| | | | |
|---|---|---|---|
| 215,294 | 5/1879 | Ramsey | 52—585 XR |
| 2,323,936 | 7/1943 | Roberts | 52—463 XR |
| 2,339,220 | 1/1944 | Crowley | 52—285 |
| 2,612,243 | 9/1952 | Campbell | 52—463 XR |
| 2,817,620 | 12/1957 | Golick et al. | 52—586 XR |
| 2,872,710 | 2/1959 | Cox | 52—615 XR |
| 3,271,056 | 9/1966 | Frisbey | 52—285 |
| 3,322,879 | 5/1967 | Lindgren | 52—615 |
| 3,336,709 | 8/1967 | Berney et al. | 52—586 XR |
| 2,757,116 | 7/1956 | Clements | 52—615 X |
| 3,147,336 | 9/1964 | Mathews | 52—584 X |

FRANK L. ABBOTT, *Primary Examiner.*

P. C. FAW, *Assistant Examiner.*

U.S. Cl. X.R.

52—309, 584, 615, 285, 717; 287—189.36